(12) United States Patent
Cuddihy et al.

(10) Patent No.: US 7,127,073 B2
(45) Date of Patent: Oct. 24, 2006

(54) AUDIO NOISE CANCELLATION SYSTEM FOR A SENSOR IN AN AUTOMOTIVE VEHICLE

(75) Inventors: Mark Cuddihy, New Boston, MI (US); Joseph Brown, Grosse Ile, MI (US); Kirsten Carr, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/161,096

(22) Filed: Jul. 22, 2005

(65) Prior Publication Data

US 2006/0002568 A1   Jan. 5, 2006

Related U.S. Application Data

(63) Continuation-in-part of application No. 10/065,006, filed on Sep. 9, 2002, now abandoned.

(51) Int. Cl.
*H04B 3/00* (2006.01)

(52) U.S. Cl. .................... 381/94.1; 381/86; 280/735; 340/438

(58) Field of Classification Search ............... 381/94.1, 381/86, 71.4; 280/735; 340/438, 446, 474, 340/436, 425.5
See application file for complete search history.

(56) References Cited

U.S. PATENT DOCUMENTS

| | | | |
|---|---|---|---|
| 5,243,661 A | 9/1993 | Ohkubo et al. | |
| 5,473,686 A | 12/1995 | Virdee | |
| 5,619,581 A | 4/1997 | Ferguson et al. | |
| 5,633,936 A | 5/1997 | Oh | |
| 5,862,234 A | 1/1999 | Todter et al. | |
| 5,978,489 A | 11/1999 | Wan | |
| 6,002,761 A | 12/1999 | Sremac | |
| 6,041,126 A | 3/2000 | Terai et al. | |
| 6,370,253 B1 | 4/2002 | Onishi | |
| 6,671,379 B1 | 12/2003 | Nemirovski | |
| 6,895,095 B1 | 5/2005 | Thomas | |
| 2003/0156723 A1 | 8/2003 | Ruwisch | |

FOREIGN PATENT DOCUMENTS

| DE | 10051699 | 5/2002 |
|---|---|---|
| GB | 1 305 359 | 1/1973 |

*Primary Examiner*—Ping Lee
(74) *Attorney, Agent, or Firm*—Gary A. Smith

(57) ABSTRACT

An assembly includes a seat 60 having a seat base 64, an occupant sensor positioned in the seat base, said occupant sensor comprising a fluid filled bladder coupled to a pressure sensor, said pressure sensor generating a pressure signal, and an audio system having an electrical output coupled to a speaker, said speaker positioned near the seat, said speaker audibly coupled to the bladder. The assembly includes a compensation circuit (12) for a sensor (22) generating electrical sensor output near a speaker (18) of an audio system (16) that comprises an inverting circuit (26) coupled to the electrical output (16) of the audio system. The inverting circuit (26) generates an inverted electrical signal corresponding to a speaker audio output. A sensor controller (24) coupled to the inverting circuit (26) and the sensor (22) generates a compensated electrical output in response to the electrical sensor output and the inverted electrical signal.

16 Claims, 3 Drawing Sheets

TIME
"NORMAL" SENSOR OUTPUT

AUDIO NOISE CANCELLATION SYSTEM FOR A SENSOR IN AN AUTOMOTIVE VEHICLE

CROSS REFERENCE TO RELATED APPLICATION(S)

The present application is a Continuation-In-Part of U.S. patent application Ser. No. 10/065,006, filed Sep. 9, 2002 now abandoned, and incorporated herein by reference.

TECHNICAL FIELD

The present invention relates generally to a compensation circuit for automotive sensors, and more particularly, to a circuit to compensate the output of a sensor for noise generated by an audio system.

BACKGROUND

Sensors are used for various applications in automotive vehicles. Sensors may be located in various locations such as the passenger compartment.

Audio systems include various speakers including a subwoofer. The subwoofer is large and difficult to package. As such, the subwoofer may be positioned in a close proximity to a sensor.

The output of the speaker and, in particular, the output of a subwoofer is a low frequency, high-power signal that generates acoustic energy that may affect the output of the sensor. In particular, the output of the sensor may vibrate or move in response to the output of the subwoofer.

One proposed solution to compensation is to use a microphone that receives signals from the speaker and converts the signals to electrical signals. However, interference from the subwoofer body may be present due to the location of the microphone. Thus, the circuit may be very accurate. Also, flexibility of packaging a microphone near the subwoofer presents difficulties particularly in the limited automotive vehicle package spaces.

It would therefore be desirable to remove the influence of the subwoofer on the output of the sensor.

SUMMARY OF THE INVENTION

The present invention reduces the influence of the subwoofer on the output of a sensor from prior known methods. In one aspect of the invention, an assembly includes a seat having a seat base, an occupant sensor positioned in the seat base, said occupant sensor comprising a fluid filled bladder coupled to a pressure sensor, said pressure sensor generating a pressure signal, an audio system having an electrical output coupled to a speaker, said speaker positioned near the seat, said speaker audibly coupled to the bladder, and a compensation circuit for a sensor generating electrical sensor output is positioned near a speaker of an audio system and comprises an inverting circuit electrically coupled to the electrical output of the audio system. The inverting circuit generates an inverted electrical signal corresponding to a speaker audio output. A sensor controller is coupled to the inverting circuit and the sensor. The controller generates a compensated electrical output in response to the electrical sensor output and the inverted electrical signal.

In a further aspect of the invention, a method for compensating for an electrical output of a sensor includes generating an audible signal from a speaker of an audio system, coupling an audible signal to an occupant sensor and generating a sensor output signal corresponding to a pressure output altered by the audible signal, generating an electrical signal at an audio system output, inverting the electrical signal to form an inverted electrical signal, and combining the inverted electrical signal and the sensor output signal to form a compensated electrical output.

One advantage of the invention is that the various sensors may be packaged without regard to the location of the speakers of the audio system. Such a system will therefore increase package flexibility in the limiting packaging space of the automotive vehicle.

Other advantages and features of the present invention will become apparent when viewed in light of the detailed description of the preferred embodiment when taken in conjunction with the attached drawings and appended claims.

DETAILED DESCRIPTION OF THE PREFERRED EMBODIMENT

The present invention is described with respect to a sensor and subwoofer positioned in a passenger compartment of an automotive vehicle. The present invention may also be used for sensors positioned within the trunk compartment, engine compartment, or various other locations within the automotive vehicle.

Figure 1:
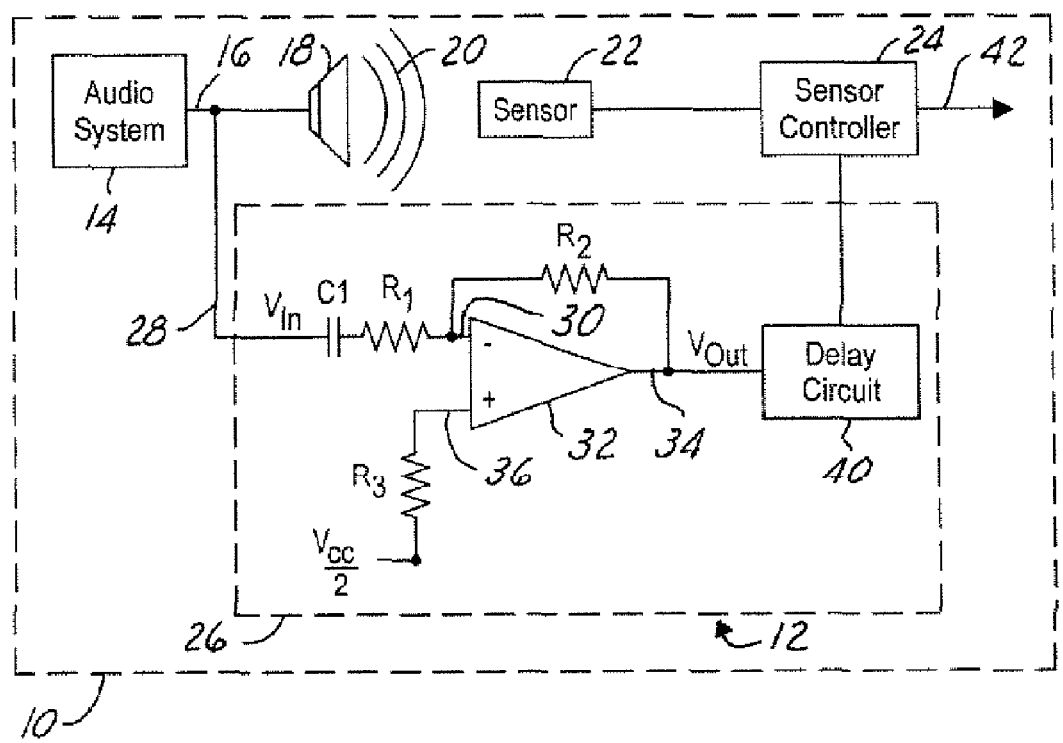
FIG. 1 is a schematic view of a compensation circuit according to the present invention.

Referring now to FIG. 1, a passenger compartment 10 of an automotive vehicle is illustrated having a compensation circuit 12 according to the present invention. The compensation circuit is electrically coupled to an audio system 14. Compensation circuit 12 is preferably coupled to an electrical output 16 of the audio system 14. The electrical output 16 is used to electrically power a speaker 18. Speaker 18 may, for example, be a subwoofer or other type of speaker. The electrical signal from the audio system generated by electrical output 16 is used to drive a transducer coil within speaker 18. The speaker 18 generates audible sound signals 20 which may be received and influence a sensor 22. Thus, the electrical signal corresponds to eventual output of the speaker. Sensor 22 may be one of a variety of types of sensors including a pressure sensor. Thus, the output of the pressure sensor 22 is changed according to the audible signals 20 generated by speaker 18. Sensor 22 is coupled to a sensor controller 24. Controller 24 is preferably microprocessor-based. However, analog and or digital circuitry may also act as a controller.

Compensation circuit 12 includes an inverting circuit 26 that has an input 28 coupled to the electrical output 16 of audio system 14 and therefore to the input of speaker 16. To filter out any DC offset, capacitor $C_1$ may be employed. Capacitor $C_1$ is coupled to input 28 and to a resistor $R_1$. Resistor $R_1$ is coupled between capacitor $C_1$ and the inverting terminal 30 of an operational amplifier 32. Inverting terminal 30 of operational amplifier 32 may also be coupled to a feedback resistor $R_2$ which in turn is coupled to an output 34 of operational amplifier 32. Operational amplifier 32 may also have a non-inverting terminal 36 coupled to a resistor $R_3$ which in turn is coupled to a reference voltage $$\frac{V_{00}}{2}.$$

By properly choosing the resistance values of $R_1$, $R_2$, and $R_3$, an inverted electrical signal is generated at output 34. In one constructed embodiment, the resistors $R_1$ $R_2$ $R_3$ are equal to obtain unity gain and was set to R1/2. By way of example, $R_1$ and $R_2$ may be 100k ohms and $R_3$ may be 50K ohms. The capacitor is sized to block DC offset and thus depends on the input to which it is attached. Capacitor $C_1$ may, for example, be I uF. Of course, the resistor values may be chosen to amplify the signals as well. Output 34 may be electrically coupled to a delay circuit 40. Delay circuit 40 is an optional feature that is used to align the inverting signal temporally with the output of the sensor. Various types of circuits may be used for delay circuit 40. Such circuits are well known to those skilled in the art. The delay circuit generates a delay signal that is added to the inverted electrical signal from the output 34 of operational amplifier 32. The delayed inverted output signal is coupled to controller 24. Controller 24 combines the inverted electrical signal and the sensor output signal to form a compensated output signal at an output 42 of controller 24. Of course, controller 24 may also use the compensated signal therein. Controller 24 may merely add the two signals together to form the compensated electrical output.

Figure 2:
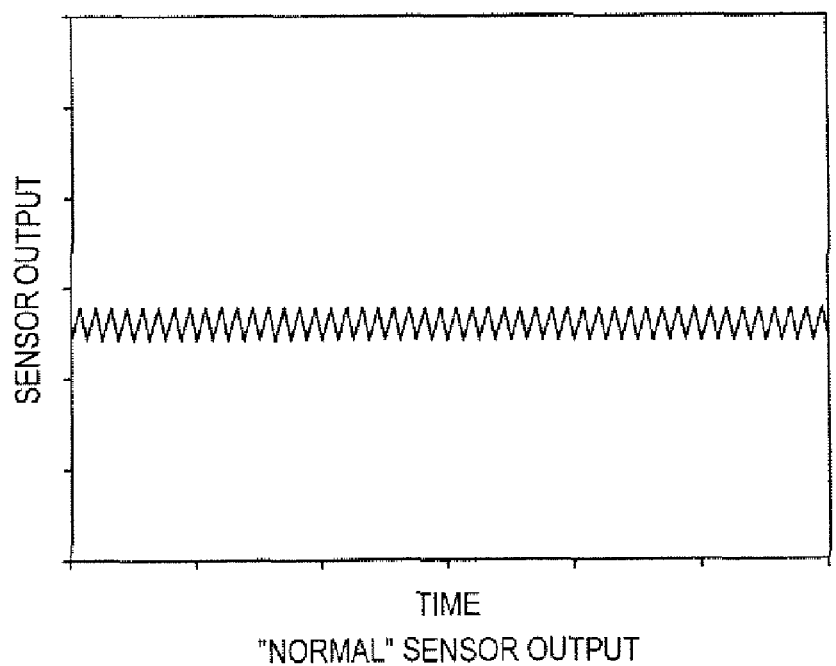
FIG. 2 is a plot of a normal sensor output.

Referring now to FIG. 2, a plot of the normal sensor output versus time is illustrated.

Figure 3:
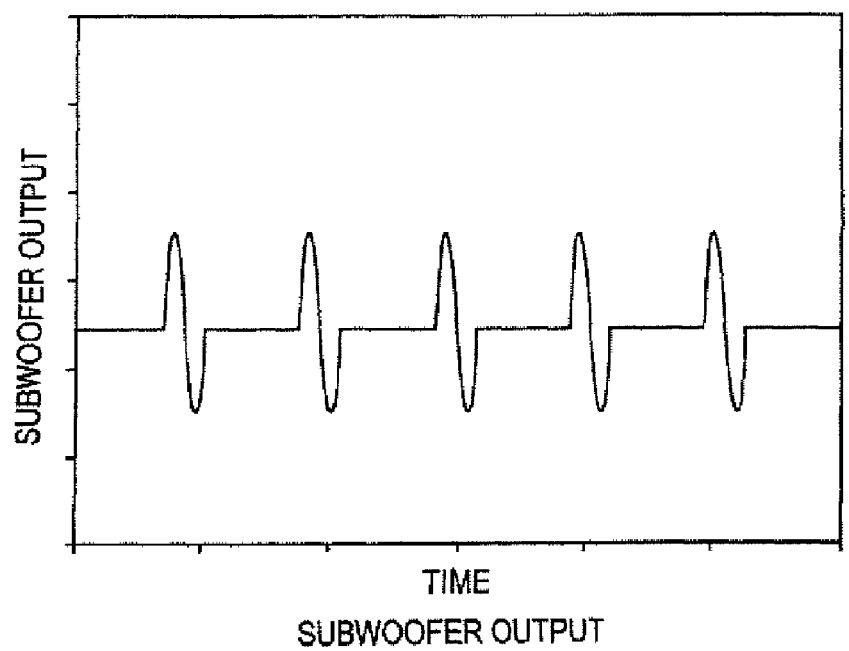
FIG. 3 is a plot of the output of the subwoofer.

In FIG. 3 the subwoofer output versus time is illustrated. This signal is the electrical output of the audio system.

Figure 4:
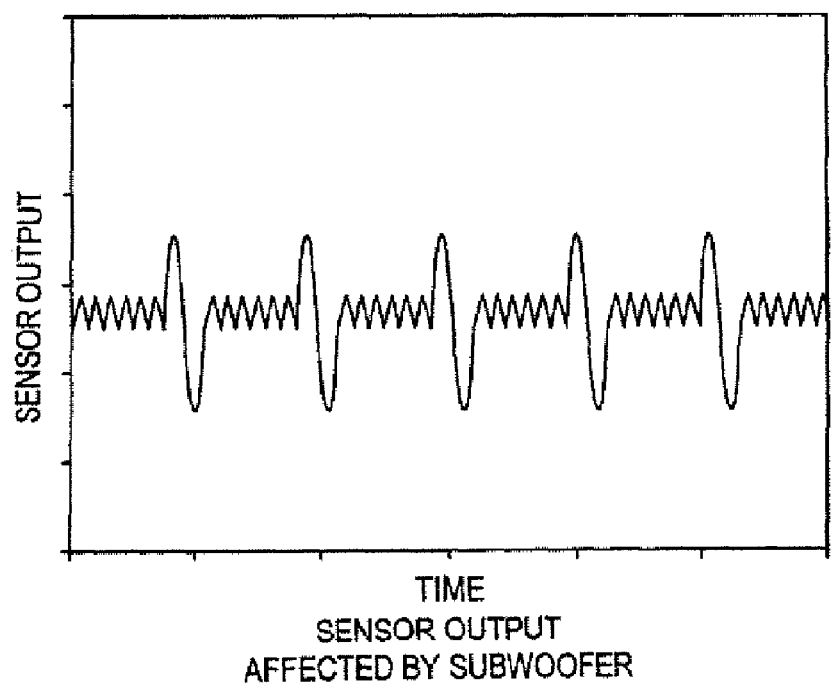
FIG. 4 is a plot of sensor output that has been affected by the output of a subwoofer.

FIG. 4 includes the sensor output that has been affected by the subwoofer output. When the electrical output of the audio system is inverted and added to FIG. 4, the compensated output signal of the present invention is thus similar to that of FIG. 2.

Advantageously, the present invention does not rely on the positioning of a microphone or other transducer device directly adjacent to the speaker. Thus, for automotive applications increased flexibility is achieved in applying the compensation circuit of the present invention.

Figure 5:
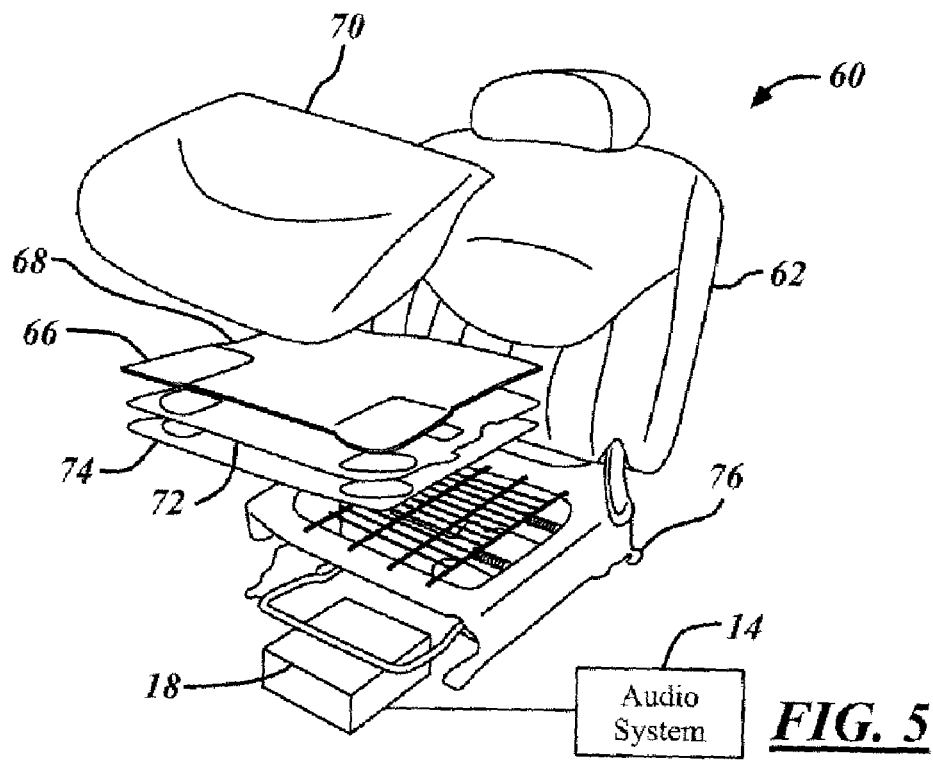
FIG. 5 is an exploded view of a seat assembly according to the present invention.
Figure 6:
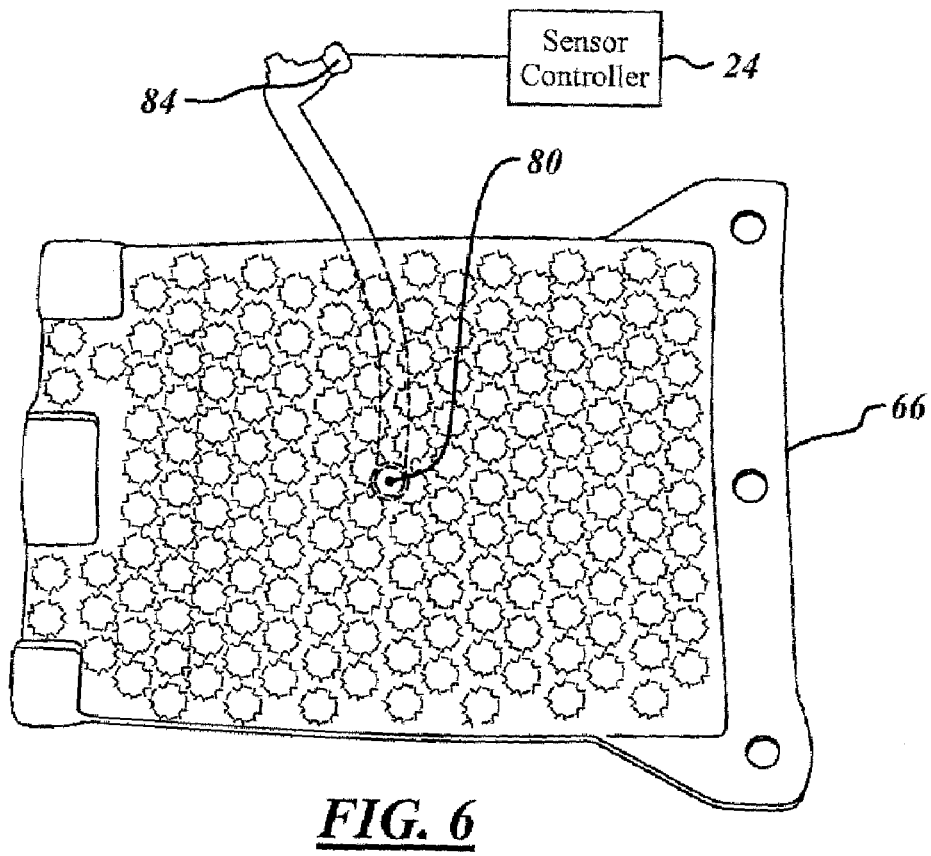
FIG. 6 is a top view of a passenger occupant detection sensor according to the present invention.

Referring now to FIG. 5, the seat assembly 60 is illustrated having a seat back 62 and seat base 64. The implementation of the present invention may be in the passenger seat of an automotive vehicle. However, various locations including the driver's seat of an automotive vehicle may be employed.

A passenger occupant sensor or occupant sensor 66 is illustrated. The occupant sensor 66 detects an amount of pressure on the seat so that the presence of and weight of the occupant may be determined. The occupant sensor may, for example, be a bladder 68 filled with silicone. The pressure of the silicone determines the presence and weight of the occupant as will be described below. The seat base 64 may also comprise a cushion 70 and a backer board 72 placed therebehind. A felt pad 74 may be disposed adjacent to the backer board 72. The cushion 70, sensor 66, backer board 72, and felt pad 74 may be disposed upon seat frame 76. As is illustrated in the figure, a speaker 18 such as a subwoofer may be placed below the seat. The sound emanating from the speaker 18 induces a change in the pressure of the occupant sensor and therefore the output of the pressure sensor coupled to the occupant sensor needs to be adjusted as described in conjunction with FIG. 1 above.

The occupant sensor 66 is illustrated in further detail. The occupant sensor 66 has a pressure port 80 therein. The pressure port 80 receives fluid from the sensor. Fluid travels down the tube 82 and reaches the pressure sensor 84. An occupant on the occupant sensor 66 creates a pressure in the fluid which is transmitted through the tube 82 and to the pressure sensor 84. Thus, as the pressure sensor output is altered due to the acoustics of the speaker, the compensation circuit subtracts an amount equivalent to the induced noise therein.

While particular embodiments of the invention have been shown and described, numerous variations and alternate embodiments will occur to those skilled in the art. Accordingly, it is intended that the invention be limited only in terms of the appended claims.

What is claimed is:

1. An assembly comprising:
    a seat having a seat base;
    an occupant sensor positioned in the seat base, said occupant sensor comprising a fluid filled bladder coupled to a pressure sensor, said pressure sensor generating a pressure signal;
    an audio system having an electrical output coupled to a speaker, said speaker positioned near the seat, said speaker audibly coupled to the bladder;
    a compensation circuit having an inverting circuit electrically coupled to the electrical output of the audio system, said inverting circuit generating an inverted electrical signal corresponding to a speaker audio output; and
    a sensor controller coupled to the inverting circuit and said pressure sensor, said controller generating a compensated electrical output signal in response to said pressure signal and said inverted electrical signal, said compensated electrical output signal corrected for an alteration by the acoustics of the speaker.

2. A compensation circuit as recited in claim 1 wherein said inverting circuit comprises an operational amplifier.

3. A compensation circuit as recited in claim 1 wherein said speaker comprises a subwoofer.

4. A compensation circuit as recited in claim 1 wherein said inverting circuit comprises a delay circuit generating a time delay in said inverted electrical signal.

5. A compensation circuit as recited in claim 1 wherein said sensor controller adds the inverted electrical signal and said electrical sensor output.

6. A compensation circuit as recited in claim 2 wherein said operational amplifier comprises a resistor coupled to an inverting input and an output.

7. A compensation circuit for compensating a pressure signal of a pressure sensor that is coupled to an occupant sensor positioned in a seat base of a seat, the occupant sensor having a fluid filled bladder, said pressure sensor generating a pressure signal, said compensation circuit coupled to an audio system having an electrical output that is coupled to a speaker, said speaker positioned near the seat, said speaker audibly coupled to the bladder, said compensation circuit comprising:
    a compensation circuit having an inverting circuit electrically coupled to the electrical output of the audio system, said inverting circuit generating an inverted electrical signal corresponding to a speaker audio output; and a sensor controller coupled to the inverting circuit and said pressure sensor, said controller generating a compensated pressure output signal in response to said pressure signal and said inverted electrical signal, said compensated pressure output signal corrected for an alteration by the acoustics of the speaker.

8. A compensation circuit as recited in claim 7 wherein said speaker comprises a subwoofer.

9. A compensation circuit as recited in claim 7 wherein said inverting circuit comprises a delay circuit generating a delay in said inverted electrical signal.

10. A compensation circuit as recited in claim 7 wherein said inverting circuit comprises an operational amplifier.

11. A compensation circuit as recited in claim 10 wherein said operational amplifier comprises a resistor coupled to an inverting input and an output.

12. A compensation circuit as recited in claim 7 wherein said sensor controller adds the inverted electrical output and said electrical sensor output.

13. A method for compensating for an electrical output of a sensor comprising:

generating an audible signal from a speaker of an audio system;

coupling an audible signal to an occupant sensor and generating a sensor output signal corresponding to a pressure output altered by the audible signal;

generating an electrical signal at an audio system output;

inverting the electrical signal to form an inverted electrical signal; and combining the inverted electrical signal and the sensor output signal to form a compensated electrical output.

14. A method as recited in claim 13 wherein the speaker comprises a subwoofer.

15. A method as recited in claim 13 further comprising generating a delay signal, wherein said inverted signal is formed in response to said delay signal.

16. A method as recited in claim 13 wherein combining comprises adding the inverted electrical output and said sensor output.

* * * * *